(12) United States Patent
Czaja et al.

(10) Patent No.: US 6,584,087 B1
(45) Date of Patent: Jun. 24, 2003

(54) POWER CONTROL DURING INTER-GENERATION SOFT HANDOFFS

(75) Inventors: Stanislaw Czaja, Cardiff, CA (US); Kraig Anderson, San Diego, CA (US)

(73) Assignee: Infineon Technologies North America Corp., San Jose, CA (US)

(*) Notice: Subject to any disclaimer, the term of this patent is extended or adjusted under 35 U.S.C. 154(b) by 0 days.

(21) Appl. No.: 09/473,777

(22) Filed: Dec. 29, 1999

Related U.S. Application Data

(60) Provisional application No. 60/138,388, filed on Jun. 9, 1999.

(51) Int. Cl.[7] .................................... H04B 7/216
(52) U.S. Cl. .................. 370/335; 370/331; 455/442; 455/522
(58) Field of Search ................ 370/331, 335, 370/342; 455/442, 436, 69, 522

(56) References Cited

U.S. PATENT DOCUMENTS

| | | | |
|---|---|---|---|
| 5,640,414 A | * 6/1997 | Blakeney et al. | 375/200 |
| 5,652,748 A | 7/1997 | Petri et al. | |
| 5,940,762 A | * 8/1999 | Lee et al. | 455/442 |
| 6,160,999 A | * 12/2000 | Chheda et al. | 444/69 |

FOREIGN PATENT DOCUMENTS

| | | |
|---|---|---|
| EP | 0 954 194 | 11/1999 |
| EP | 0 954 195 | 11/1999 |

* cited by examiner

*Primary Examiner*—Lee Nguyen
(74) *Attorney, Agent, or Firm*—Fish & Richardson P.C.

(57) ABSTRACT

A method for power control during soft handoffs is disclosed for a multi-user CDMA system having mixed system types, such as IS-95A/B and IS-2000. The procedure includes modifying the Forward Power Control (FPC) and Reverse Power Control (RPC) processing, in order to maintain proper power control between a mobile station and two different base stations during a soft handoff. The mobile station maintains the forward and reverse power control while still receiving forward links from different generation base stations, and while maintaining the reverse link to only one of these base stations. Prior to the soft handoff the second base station suspends FPC and RPC processing. Once the soft handoff is complete, the second base station resumes FPC and RPC processing. Furthermore, the mobile station's initial transmit power level is set to be within a predetermined limit.

30 Claims, 3 Drawing Sheets

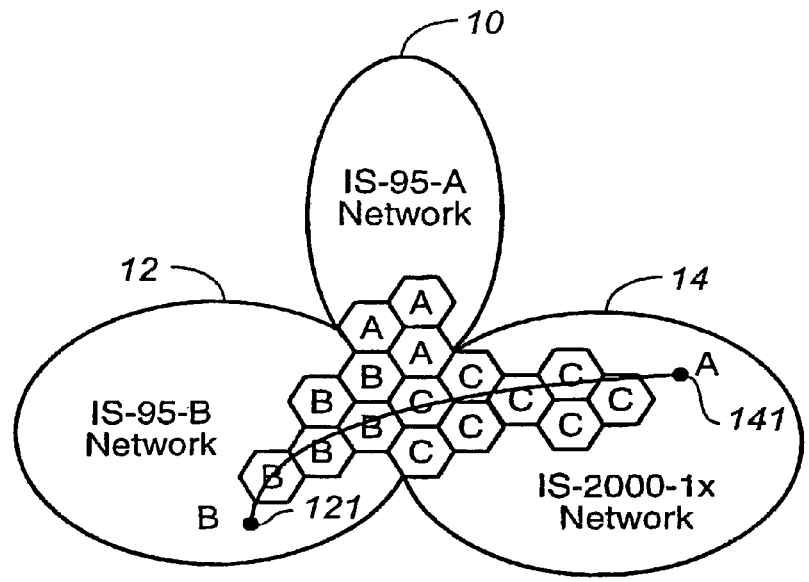
FIG._1
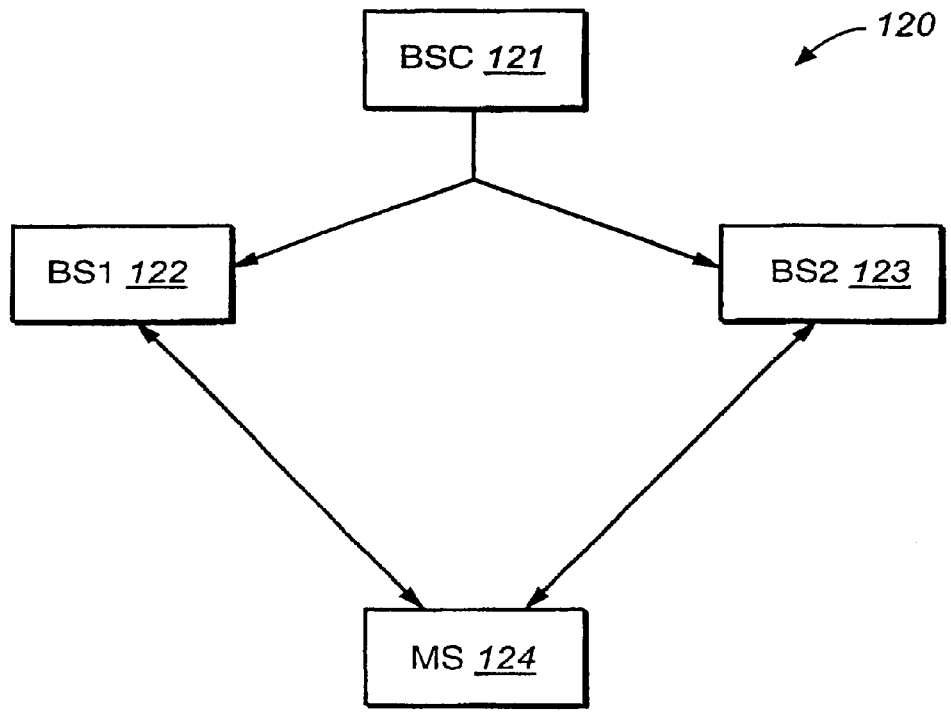
FIG._5

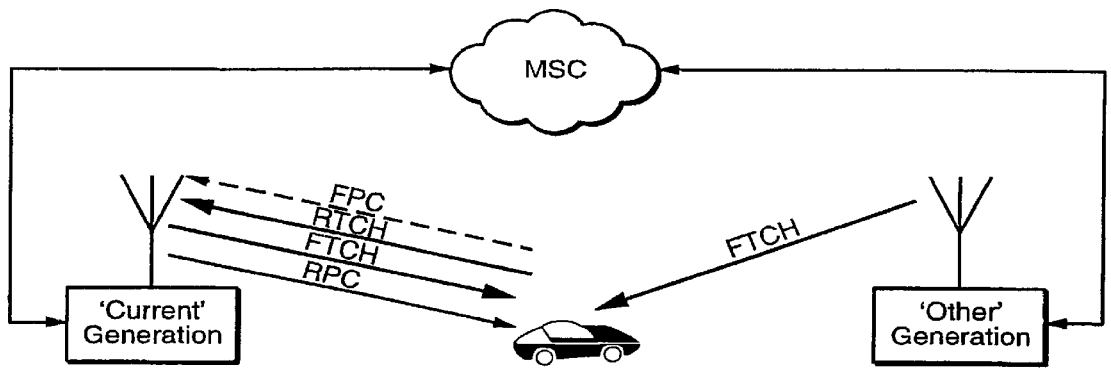
FIG._2
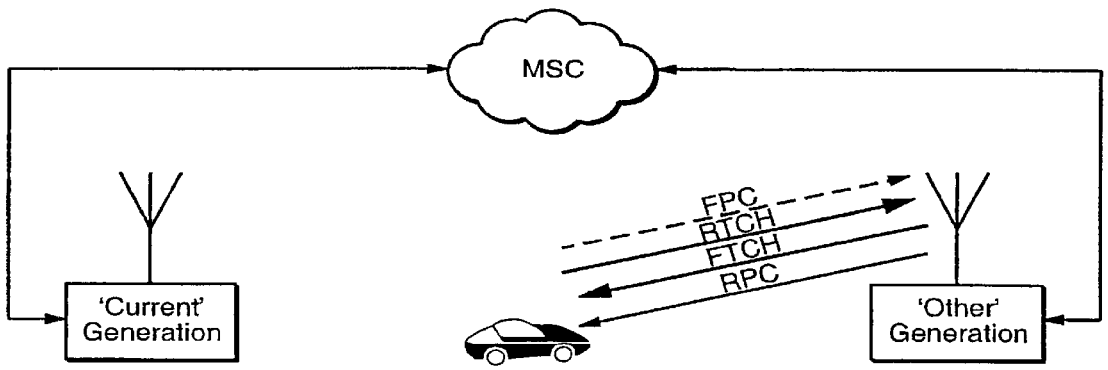
FIG._3

IGSHO Procedure

| Mobile Stations | | | | Base Station |
|---|---|---|---|---|
| (User conversation using CG) | | | | (User conversation using CG) |
| • OG Pilot strength exceeds T_ADD. | | | | |
| • Sends *Pilot Strength Measurement Message*. | > | Reverse Traffic Channel | > | CG receives *Pilot Strength Measurement Message*. |
| • Receives *Intergeneration Handoff Direction Message*, with radio config. parameters of the OG base Station. | < | Forward Traffic Channel | < | CG sends *Intergeneration Handoff Direction Message* to use CG and OG. |
| • Acquires OG; begins using Active Set {CG, OG}.<br>• Starts diversity combining or selection combining depending on radio configuration parameters.<br>• Transmits and maintains power control with CG only. | | | | • OG begins transmitting traffic on the Forward Traffic Channel<br>• OG suspends the Reverse Traffic Channel and reverse and forward power control. |
| • CG pilot drops below CT_DROP handoff threshold.<br>• Starts CT_TDROP handoff timer. | | | | |
| • CT_DROP expires.<br>• OT_ADD successful frames received on OG. | | | | |
| • Sends *Intergeneration Handoff Completion Message*. | > | Reverse Traffic Channel | > | • CG receives *Intergeneration Handoff Completion Message*. |
| • Receives *Extended Handoff Direction Message*. | < | Forward Traffic Channel | < | • CG and OG send *Extended Handoff Direction Message* to use OG only. |
| • Stops diversity combining; begins using Active Set {OG}.<br>• Starts transmitting at the OG O_INIT_PWR power level. | | | | • OG starts processing of the Reverse Traffic Channel.<br>• OG starts processing of forward and reverse power control. |
| • Sends *Handoff Completion Message*. | > | Reverse Traffic Channel | > | • OG receives *Handoff Completion Message*. |
| (User conversation using OG) | | | | (User conversation using OG) |

*FIG. 4*

POWER CONTROL DURING INTER-GENERATION SOFT HANDOFFS

This application claims priority from U.S. Provisional Application No. 60/138,388, filed Jun. 9, 1999, entitled "POWER CONTROL DURING INTER-GENERATION SOFT HANDOFFS," herein incorporated by reference; and is related to U.S. patent application Ser. No. 09/314,987, filed May 20, 1999, entitled "FORWARD LINK INTER-GENERATION SOFT HANDOFFS BETWEEN 2G AND 3G CDMA SYSTEMS," herein incorporated by reference.

BACKGROUND OF THE INVENTION

1. Field of the Invention

The present invention relates generally to communication systems, and more particularly, to a method for power control during soft handoffs between second generation (2G) and third generation (3G) (2G⇒3G or 3G⇒2G) Code Division Multiple Access (CDMA) systems.

2. Description of the Related Art

One commonly used type of cellular radiotelephone communication system is referred to as a Code Division Multiple Access (CDMA) system. In a CDMA system, the radio signals share the same frequency spectrum at the same time, in contrast to previous Frequency Division Multiple Access (FDMA) or Time Division Multiple Access (TDMA) systems. One current CDMA standard, known as the second generation standard or 2G, is designated as TIA/EIA-95-A/B (or IS-95-A/B), and is herein incorporated by reference. More recently, a new third generation (3G) CDMA standard has been proposed and has been designated as IS-2000 (previously IS-95-C) or CDMA2000, and is herein incorporated by reference. As the new 3G systems are installed, cellular systems will contain a mix of both old 2G systems and the new 3G compatible systems.

In a typical CDMA cellular radiotelephone communication system, a mobile station communicates with one or more base stations. In order to track the available signals, the mobile station maintains a list of available base stations, and each station's relative signal strength. Specifically, each base station in the CDMA system transmits an unmodulated "pilot" signal, which is delayed by a base station offset. A mobile station receives the pilot signals and determines which pilot signals are the strongest. A "searcher" unit located in the mobile station commonly performs the signal detection and strength measurement functions.

The results from the searcher are reported to the current (i.e. active) base station. The base station then instructs the mobile station to update a list of available base stations maintained by the mobile station. The list is sub-divided into three operative sets—an Active Set, a Candidate Set, and a Neighbor Set. The Active Set contains a list of the base stations with which the mobile station is currently communicating (typically 1–6 base stations). The Candidate Set is a list of base stations which may be moved into the Active Set, and the Neighbor Set is a list of base stations which are being monitored, but less frequently.

As the mobile station moves and its currently active base station signal weakens, the mobile station must access a new base station. Based upon the results of the searcher, and the instructions received back from the base station, the mobile station will update its sets, and communicate with a different base station. In order for communication transmissions to appear seamless to the user of the mobile station, the communication link must be handed off to the next base station. Ideally, this handoff would establish a new link before terminating the first link. This type of handoff is known as a soft handoff (SHO) or "Make-Before-Break."

Techniques for implementing a soft handoff between two different generation base stations are disclosed in U.S patent application Ser. No. 09/314,987, filed May 20, 1999, entitled "FORWARD LINK INTER-GENERATION SOFT HANDOFFS BETWEEN 2G AND 3G CDMA SYSTEMS." The proposed soft handoff solutions, however, rely only on the forward link, and not on the reverse link, due to the incompatibility between the 2G and 3G reverse links. In a CDMA system, a mobile station communicates with a base station via a reverse link, and the base station communicates with the mobile on a forward link. The reverse link is especially important for providing power control information in the CDMA system.

In a CDMA system, each base station attempts to keep the strength of the received signal from all of the mobile stations with which it is communicating at approximately the same strength. This is a central feature in a CDMA system that enables the detection of each mobile station in a multi-user system. Specifically, a base station measures the strength of each arriving mobile signal and then sends power control commands to each mobile station. This power control information is transmitted on the forward link and is known as Reverse Power Control or RPC. The mobile station demodulates and decodes the RPC commands and changes its transmit power accordingly. Note that RPC commands are transmitted on the forward link (base to mobile), but instruct the mobile station to adjust the power on the reverse link (mobile to base).

Additionally, a second power control channel transmitted on the reverse link, the Forward Power Control (FPC) channel, is maintained. The FPC channel assures that the mobile station receives enough signal energy to achieve the desired quality of service (QOS). For the IS-95A/B systems, the FPC is based on the reported frame error rate (FER) of the forward link or on frame erasure indicator bits received from the mobile station. In the IS-2000 system, the mobile station maintains the FPC by measuring the received signal energy and then comparing the energy with a desired QOS. If the received signal energy differs from the desired level, the mobile station sends the power control command on the Reverse Traffic Channel (RTCH) requesting changes to its Forward Traffic Channel (FTCH) transmit power.

The air interface of the new 3G (IS-2000) system uses a new modulation scheme to allow better spectral efficiency, as well as different spreading factors. However, a part of the new 3G system, which operates within the same channel bandwidth as the old 2G system, is required to be compatible with the 2G system at the signaling and call processing level. The reverse link of the 3G system, though, employs coherent demodulation, whereas the reverse link of the 2G system employs non-coherent demodulation. Thus, in the 3G specification, there was no attempt to make these two systems compatible at the physical layer.

Additionally, the forward links of the two systems use different modulation methods (QPSK (3G) vs. BPSK (2G)), which require some modifications within the new 3G system's demodulator. However, since the IS-2000 terminal (i.e. mobile station) must be able to operate in the IS-95-A/B network, the new 3G terminal is able to switch its mode of operation from one system to the other automatically. In practice, it is impractical to perform a reverse link SHO between 2G and 3G systems because the 3G base station cannot demodulate a 2G reverse link and vice versa (coherent vs. non-coherent, different modulations, etc.).

As a mobile station migrates from a "current" generation base station to an "other" generation base station, only the Forward Traffic Channel (FTCH) is in a soft handoff mode, while the Reverse Traffic Channel (RTCH) is maintained with the "current" generation base station. This is due to the impracticality of building a mobile station capable of simultaneously processing and modulating signals for an IS-95A/B and an IS-2000 reverse link. For the CDMA FTCH, however, the mobile station is capable of demodulating two different generation signals, since it contains a Rake receiver, containing several demodulating elements.

Since the mobile station only maintains the reverse link with one generation of base stations during an inter-generation soft handoff (ISHO), closed loop power control is only possible with those base stations. As such, during ISHO, the "other" generation base station will not receive the mobile station reverse link until successful termination of the ISHO procedure, thus disrupting its power control processing. In particular, each base station attempts to provide master power control processing for all the mobile stations with which it is communicating. Since the reverse link is not used during an ISHO, the "other" generation base station is unable to hear the mobile station.

During an ISHO, the "other" generation base station, while measuring the energy of the nonexistent RTCH, may request an increase in the power of the channel from the mobile station. Simultaneously, the base station may also increase its transmit power under the assumption that the mobile station has an impaired channel condition (i.e. shadow fading). Assuming that the sudden increase in the power of the mobile station which is in ISHO will change the power balance at the input to the base station receiver, the base station may also request that all other mobile stations in its service area increase their transmit power. Both of these events, the increase of the FTCH power dedicated to the mobile station during ISHO, as well as the increase of transmit power to all other mobile stations, will have a significant negative impact on the service quality to other mobile stations and on the capacity of the system. Thus, there is a need for an improved method to control power during an inter-generation soft-handoff.

SUMMARY OF THE INVENTION

The present invention is a method for power control during soft handoffs for a multi-user CDMA system having mixed system types, such as IS-95A/B and IS-2000. The present procedure includes modifying the Forward Power Control (FPC) and Reverse Power Control (RPC) processing, in order to maintain proper power control between a mobile station and two different base stations during a soft handoff.

The mobile station maintains the forward and reverse power control while still receiving forward links from different generation base stations, and while maintaining the reverse link to only the first base station. Prior to the soft handoff, the second base station suspends FPC and RPC processing. Once the soft handoff is complete, the second base station resumes FPC and RPC processing. Furthermore, the mobile station's initial transmit power level is set to be within a predetermined limit. The present procedure limits the interference to the other users on the forward and reverse channel, while still allowing "make-before-break" transitions from one generation system to another generation system.

BRIEF DESCRIPTION OF THE DRAWINGS

The present invention will be readily understood by the following detailed description in conjunction with the accompanying drawings, wherein like reference numerals designate like structural elements, and in which:

FIG. 1 is diagram illustrating one possible IS-2000 deployment scenario;

FIG. 2 is a diagram illustrating the communication protocol for the soft handoff with power control according to the present invention;

FIG. 3 is a diagram illustrating the communications of a mobile with a base station after the soft handoff has completed;

FIG. 4 is a table illustrating a soft handoff messaging procedure according to the present invention; and FIG. 5 is a block diagram of a CDMA system configured to operate according to the present invention.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method for power control during soft handoffs between second generation (2G) and third generation (3G) (2G⇒3G or 3G⇒2G) Code Division Multiple Access (CDMA) systems. The present invention has been defined herein with regard to specific message names and parameters. Those skilled in the art will recognize, however, that the teachings of the present invention are not limited to specific messages or parameters, but may be employed using any similar scheme.

In one embodiment, the deployment model of the 3G system consists of a partial overlay of the current 2G (IS-95-A/B) networks 10,12 and the new 3G (IS-2000) network 14, as shown in FIG. 1. According to the prior art, as the mobile station travels from one generation 121 to another generation 141 of the network, it is unable to maintain power control information on the reverse links with different generation base stations during a soft handoff. The present invention provides a method in which the mobile station maintains the forward and reverse power control while receiving forward links from different generation base stations, and while maintaining the reverse link to only one of these base stations.

During an inter-generation soft handoff (ISHO), the forward and reverse power control is maintained by a set of messages and timers. Additionally, the base station without a current serving RTCH will be required to suspend its FPC and RPC until the completion of the ISHO procedure. The initial power level used by the mobile station when it starts transmitting to the "other" generation base station is set by a predetermined parameter.

Specifically, power control during an ISHO can be accomplished using the following procedure:
1. While communicating with the "current" generation (CG) base station, a mobile station migrates into the "other" generation (OG) network as shown in FIG. 2.
2. When the "other" generation pilot strength signal exceeds T_ADD, the mobile station sends a Pilot Strength Measurement Message. The "other" generation base station is added to the mobile station's active set using the Inter-generation Handoff Direction Message (IHDM) which specifies such parameters as a generation parameter (IS-95B_IS-2000), a radio configuration parameter (RADIO_CONFIG), a FTCH drop timer and threshold (CT_TDROP, CT_DROP), a RTCH initial power level (O_INT_POWER), and a RTCH timer (OT_ADD).

3. During this phase of the ISHO, denoted as phase 1, the "other" generation base station begins transmission on the FTCH while suspending both reverse and forward power control for this mobile station. The mobile station continues transmission of the "current" generation reverse link, maintaining its current power control link, and starts diversity combining or selection combining, depending on the radio configuration. See FIG. 2.

4. When the Pilot Ec/Io of the "current" generation base station falls below CT_DROP, the mobile station starts the CT_TDROP handoff timer. When CT_DROP expires and the mobile station has received OT_ADD good frames using the "other" generation base station, an Intergeneration Handoff Completion Message (IHCM) is sent to the "current" generation base station.

5. Upon receiving the IHCM, an Extended Handoff Direction Message is sent by both base stations instructing the mobile station to only use the signal from the "other" base station. The mobile station starts transmitting to the "other" generation base station at a power level specified by O_INIT_PWR using the proper radio configuration, and the "other" generation base station starts processing the Reverse Traffic Channel along with the forward and reverse power control. This phase is known as phase 2 and is depicted in FIG. 3.

6. The mobile station now sends a Handoff Completion Message indicating that the ISHO is complete.

This procedure is summarized in the table of FIG. 4. Although reference to the FTCH is made throughout this discussion, this same procedure is applicable when the IS-2000 system is operating on the Forward Dedicated Control Channel, or any other similar channel such as the F_SUPPLEMENTAL CHANNEL, or the F_COMMON CONTROL CHANNEL.

Thus, the present invention provides a method in which the mobile station maintains the forward and reverse power control while still receiving forward links from different generation base stations, and while maintaining the reverse link to only one of these base stations. The power control loops of the base station, which is only communicating on the forward link, is not disturbed by the present ISHO procedure. Furthermore, the mobile station's initial transmit power level is guaranteed to be within a desired limit. The present procedure limits the interference to the other users on the forward and reverse channel, while still allowing "make-before-break" transitions from one generation system to another generation system, thus improving the system capacity and the quality of service.

An example of a CDMA system 120 incorporating the present invention is shown in FIG. 5. A mobile station 124 communicates with a first base station 122. As the mobile station 124 moves, it must be handed off to a closer base station 123. As new 3G systems are introduced, a CDMA system 120 will have a mixture of both 2G and 3G systems. According to the present invention, a common base station controller 121 controls both the 2G and 3G base stations 122, 123. In this case, for example, the first base station 122 may be a 2G system and the second base station 123 may be a 3G system.

If the CDMA system 120 is configured according to the present invention, the mobile station 124 will not change its transmit power, and the base stations will not request a power level change until the soft handoff is complete. Interestingly, this improvement can be accomplished without significant additional hardware complexity. The 2G controllers merely need to have updated software incorporating the present invention, which is much less expensive than adding new hardware.

Those skilled in the art will appreciate that various adaptations and modifications of the just-described preferred embodiments can be configured without departing from the scope and spirit of the invention. For example, additional messages may be added or the data structures modified in the proposed IS-2000 specification to produce the same results as those described herein. Furthermore, the present invention may be extended to the European CDMA implementations, to allow power control during soft handoffs between IS-2000 and W-CDMA or GSM and W-CDMA systems. Therefore, it is to be understood that, within the scope of the appended claims, the invention may be practiced other than as specifically described herein.

What is claimed is:

1. In a CDMA cellular radiotelephone system, a method for power control during a soft handoff between a first system and a second system, wherein the first and second systems are of different CDMA types, the method comprising:

maintaining a Forward Power Control (FPC) channel and a Reverse Power Control (RPC) channel with a first system, while a mobile station receives a forward link from both the first and second systems;

maintaining a reverse link between the mobile station and only the first system; and suspending a Reverse Traffic Channel (RTCH), a Forward Power Control (FPC) channel and a Reverse Power Control (RPC) channel with the second system until the soft handoff is performed.

2. The method of claim 1, further comprising:

processing the Reverse Traffic Channel (RTCH), the Forward Power Control (FPC) and the Reverse Power Control (RPC) channel for the second system once the soft handoff is performed.

3. The method of claim 1, further comprising setting an initial power level of the mobile station to a predetermined level for communicating with the second system.

4. The method of claim 3, wherein the first system is a second generation CDMA system and the second system is a third generation CDMA system.

5. The method of claim 3, wherein the first system is a third generation CDMA system and the second system is a second generation CDMA system.

6. The method of claim 3, wherein the first system is a GSM system and the second system is a W-CDMA system.

7. The method of claim 3, wherein the first system is a W-CDMA system and the second system is a GSM system.

8. The method of claim 3, wherein the first system is an IS-2000 system and the second system is a W-CDMA system.

9. The method of claim 3, wherein the first system is a W-CDMA system and the second system is an IS-2000 system.

10. In a CDMA cellular radiotelephone system, a method for power control during a soft handoff between a first system and a second system when a mobile station moves across systems, wherein the first and second systems are of different CDMA types and each system comprises a base station, the method comprising:

(a) sending a pilot strength message from the mobile station to the first system on a first Reverse Traffic Channel (RTCH);

(b) sending a handoff direction message with radio configuration parameters on a Forward Traffic Channel (FTCH) or Forward Dedicated Control Channel from the first system to the mobile station;

(c) sending an intergeneration handoff completion message on the first Reverse Traffic Channel (RTCH) from the mobile station to the first system;

(d) sending an extended handoff direction message from both the first and second systems to the mobile station; and (e) sending a handoff completion message on a second Reverse Traffic Channel (RTCH) from the mobile station to the second system.

11. The method of claim 10, wherein between (b) and (c), the second system begins transmitting traffic on a Forward Traffic Channel (FTCH), and suspends a Reverse Traffic Channel (RTCH), a Forward Power Control (FPC) channel, and a Reverse Power Control (RPC) channel.

12. The method of claim 11, wherein between (d) and (e), the second system starts processing the Reverse Traffic Channel (RTCH), and starts processing the FPC and the RPC.

13. The method of claim 12, wherein before (a), the mobile station determines when a pilot strength signal from the second system exceeds a threshold value.

14. The method of claim 13, wherein after (b), the mobile station begins either diversity combining or selection combining, and transmits and maintains power control only with the first system.

15. The method of claim 14, wherein between (d) and (e), the mobile station stops combining and begins communicating with only the second system at a predetermined power level.

16. The method of claim 15, wherein the first system is a second generation CDMA system and the second system is a third generation CDMA system.

17. The method of claim 15, wherein the first system is a third generation CDMA system and the second system is a second generation CDMA system.

18. The method of claim 15, wherein the first system is a GSM system and the second system is a W-CDMA system.

19. The method of claim 15, wherein the first system is a W-CDMA system and the second system is a GSM system.

20. The method of claim 15, wherein the first system is an IS-2000 system and the second system is a W-CDMA system.

21. The method of claim 15, wherein the first system is a W-CDMA system and the second system is an IS-2000 system.

22. The method of claim 10, wherein sending the handoff direction message comprises sending the handoff direction message from only the first system to the mobile station.

23. A CDMA cellular radiotelephone system having a power-controlled soft handoff, the system comprising:

a first base station of a first system type;

a second base station of a second system type, the second base station suspending a Reverse Traffic Channel (RTCH), a Forward Power Control (FPC) channel and a Reverse Power Control (RPC) channel during a soft handoff, until the soft handoff is completed; and a mobile station that maintains a reverse link, a Forward Power Control Channel (FPC) channel and a Reverse Power Control (RPC) channel with the first base station, and receives a forward link from both the first and second base stations during a soft handoff until the soft handoff is completed.

24. The system of claim 23, wherein the second base station processes the Reverse Traffic Channel (RTCH), the Forward Power Control (FPC) and the Reverse Power Control (RPC) channel for the second base station once the soft handoff is completed.

25. The system of claim 24, wherein the first base station is a second generation CDMA system and the second base station is a third generation CDMA system.

26. The system of claim 24, wherein the first base station is a third generation CDMA system and the second base station is a second generation CDMA system.

27. The system of claim 24, wherein the first base station is a GSM system and the second base station is a W-CDMA system.

28. The system of claim 24, wherein the first base station is a W-CDMA system and the second base station is a GSM system.

29. The system of claim 24, wherein the first system is an IS-2000 system and the second system is a W-CDMA system.

30. The system of claim 24, wherein the first system is a W-CDMA system and the second system is an IS-2000 system.

* * * * *

UNITED STATES PATENT AND TRADEMARK OFFICE
CERTIFICATE OF CORRECTION

PATENT NO. : 6,584,087 B1
DATED : June 24, 2003
INVENTOR(S) : Stanislaw F. Czaja and Kraig Anderson It is certified that error appears in the above-identified patent and that said Letters Patent is hereby corrected as shown below:

Column 8,
Line 17, after "Control" please delete -- Channel --.

Signed and Sealed this

Twenty-second Day of June, 2004

JON W. DUDAS
*Acting Director of the United States Patent and Trademark Office*